(12) United States Patent
Briggs

(10) Patent No.: US 12,228,079 B1
(45) Date of Patent: Feb. 18, 2025

(54) AIR FLOW AIDED LNG VAPORIZER AND COMPRESSION SYSTEM

(71) Applicant: Texas Fueling Services, Inc., Houston, TX (US)

(72) Inventor: Paul Briggs, Houston, TX (US)

(73) Assignee: Texas Fueling Services, Inc.

( * ) Notice: Subject to any disclaimer, the term of this patent is extended or adjusted under 35 U.S.C. 154(b) by 0 days.

(21) Appl. No.: 18/499,175

(22) Filed: Oct. 31, 2023

Related U.S. Application Data

(60) Provisional application No. 63/519,420, filed on Aug. 14, 2023.

(51) Int. Cl.
*F02M 21/06* (2006.01)
*F02C 7/224* (2006.01)
*F02C 7/228* (2006.01)

(52) U.S. Cl.
CPC .............. *F02C 7/224* (2013.01); *F02C 7/228* (2013.01); *F02M 21/06* (2013.01)

(58) Field of Classification Search
CPC .......... F02M 21/06; F02C 7/228; F02C 7/224
See application file for complete search history.

(56) References Cited

U.S. PATENT DOCUMENTS

| | | | |
|---|---|---|---|
| 1,823,004 A * | 9/1931 | Replogle | F25D 17/067 62/220 |
| 7,878,170 B1 * | 2/2011 | Herzer | F02M 21/06 123/195 A |
| 10,927,802 B2 | 2/2021 | Oehring et al. | |
| 11,674,484 B2 | 6/2023 | Oehring et al. | |
| 2010/0206004 A1 * | 8/2010 | Davidian | F25J 3/04193 62/643 |
| 2013/0340459 A1 * | 12/2013 | Pomme | B64D 13/08 62/238.6 |
| 2016/0006049 A1 * | 1/2016 | Kwon | H01M 8/04992 429/446 |
| 2016/0087300 A1 * | 3/2016 | Gould | H01M 8/1004 156/60 |
| 2018/0283321 A1 * | 10/2018 | Bin Yamin | F02K 9/563 |

(Continued)

FOREIGN PATENT DOCUMENTS

| | | | |
|---|---|---|---|
| CN | 209926915 U * | 1/2020 | |
| KR | 200410367 Y1 * | 3/2006 | |

(Continued)

OTHER PUBLICATIONS

Translation of WO2019097571 (Year: 2019).*

(Continued)

*Primary Examiner* — Filip Zec

(74) *Attorney, Agent, or Firm* — Patterson + Sheridan, LLP

(57) ABSTRACT

Embodiments of the present disclose relate to a system of distributing fuel gas. The system of distributing fuel gas includes a vaporizer and compression system (VCS). The VCS includes a vaporizer, a compressor configured to produce compressed fuel gas (CFG) from LFG, and a mounting base. The vaporizer includes a fuel gas inlet configured to provide LFG to the vaporizer from a LFG source, and a fuel gas outlet. The compressor includes a distribution outlet, an exhaust, and a fan. The fan is configured to flow air and gas emitted from the exhaust toward the vaporizer. The vaporizer and the compressor are disposed on the mounting base.

14 Claims, 7 Drawing Sheets

(56) References Cited

U.S. PATENT DOCUMENTS

2020/0243888 A1\* 7/2020 Gervasio ............. H01M 8/0258
2020/0395626 A1\* 12/2020 Grishashvili ..... H01M 8/04753

FOREIGN PATENT DOCUMENTS

| KR | 20140078869 A | \* | 6/2014 | | |
|----|---------------|---|--------|---|---|
| KR | 102566242 B1 | | 8/2023 | | |
| WO | WO-2019097571 A1 | \* | 5/2019 | ............. | F25J 1/0022 |

OTHER PUBLICATIONS

Translation of KR20140078869 (Year: 2014).\*
Translation of KR200410367 (Year: 2004).\*
Translation of CN 209926915 (Year: 2020).\*

\* cited by examiner

AIR FLOW AIDED LNG VAPORIZER AND COMPRESSION SYSTEM

CROSS-REFERENCE TO RELATED APPLICATIONS

This application claims benefit of U.S. provisional patent application Ser. No. 63/519,420, filed Aug. 14, 2023, which is herein incorporated by reference.

TECHNICAL FIELD

The present disclosure generally relates to the field of gas distribution and delivery to one or more gas consuming assets. In particular, to a method and system for vaporizing liquid fuel gas.

BACKGROUND OF THE INVENTION

In many applications, fuel gas is distributed to one or more fuel consuming assets. The fuel consuming assets may be located a distance from the source of the fuel gas and may utilize differing amounts of fuel gas.

Fuel gas, such as natural gas, may be delivered to one or more fuel consuming assets located at a job site, such as a fracking location. In typical fuel gas delivery systems, liquid fuel gas (LFG) may be fed to a vaporizer (e.g., an ambient vaporizer) in order to produce regasified fuel gas (RFG). The compressor may then compress the RFG into compressed fuel gas (CFG) and supply the CFG to a fracking fleet through a daisy chain system or Direct to End Use system.

The typical arrangement has several shortcomings, a non-exhaustive list of which follows. For instance, a significant amount of equipment is utilized at the fracking site in order to create the RFG. This may be due to the fact that the ambient vaporizers used to regasify the fuel gas utilize a high surface area to vaporize the LFG at extended and higher rates. The typical fuel gas delivery system uses 6-8 ambient vaporizers to provide sufficient fuel to a fracking fleet, resulting in increased size, cost, and complexity of conventional systems. Additionally, the ambient vaporizers are dependent on the outside atmosphere. Therefore, if the ambient temperature is cool or there is no wind, the efficiency of the ambient vaporizer decreases. A decrease in the efficiency of the ambient vaporizer may lead to a decrease in the displacement value, e.g., the percentage of natural gas fuel used to displace other forms of fuels.

There is therefore a need for a method and system that addresses these and other shortcomings of prior art fuel gas distribution systems.

SUMMARY

Embodiments disclosed herein generally relate to distribution and delivery of gas to one or more gas consuming assets. In particular, the embodiments disclosed herein relate to a method and system for vaporizing liquid fuel gas.

The present disclosure may comprise one or more of the following features and combinations thereof.

According to an illustrative embodiment, a fuel gas distribution system is disclosed. The fuel gas distribution system can be operably coupled to a fracking fleet comprising one or more fuel consuming assets at a downstream end thereof, and a liquid fuel gas (LFG) source at an upstream end thereof. The fuel gas distribution system includes a vaporizer and compression system (VCS), and a distribution line system. The VCS includes a vaporizer, a compressor configured to produce compressed fuel gas (CFG) from LFG, and a mounting base. The vaporizer includes a fuel gas inlet configured to provide LFG to the vaporizer from the LFG source, and a fuel gas outlet. The compressor includes a distribution outlet, an exhaust, and a fan. The fan is configured to flow air and gas emitted from the exhaust toward the vaporizer. The vaporizer and the compressor are disposed on the mounting base. The distribution line system is configured to receive CFG from the distribution outlet and to provide CFG to the fracking fleet (or another fuel consuming asset).

According to another illustrative embodiment, a vaporizer and compression system (VCS) is disclosed. The VCS includes a vaporizer, a compressor, and a mounting base. The vaporizer includes a fuel gas inlet and a fuel gas outlet. The compressor includes a distribution outlet, an exhaust, and a fan. The vaporizer and the compressor are disposed on the mounting base.

According to another illustrative embodiment, a method for distributing fuel gas is disclosed. The method includes providing liquid fuel gas (LFG) to a vaporizer; regasifying the LFG into a regasified fuel gas (RFG); providing the RFG to a compressor; compressing the RFG to form compressed fuel gas (CFG); emitting air and gases from an exhaust of the compressor; flowing the air and gases from the exhaust toward the vaporizer; and providing the CFG to a fracking fleet.

The objects, advantages and other features of the present invention will become more apparent upon reading of the following non-restrictive description of a preferred embodiment thereof, given by way of example only with reference to the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

For a more complete understanding of the present disclosure and its features and advantages, reference is now made to the following description, taken in conjunction with the accompanying drawings, in which.

Figure 1:
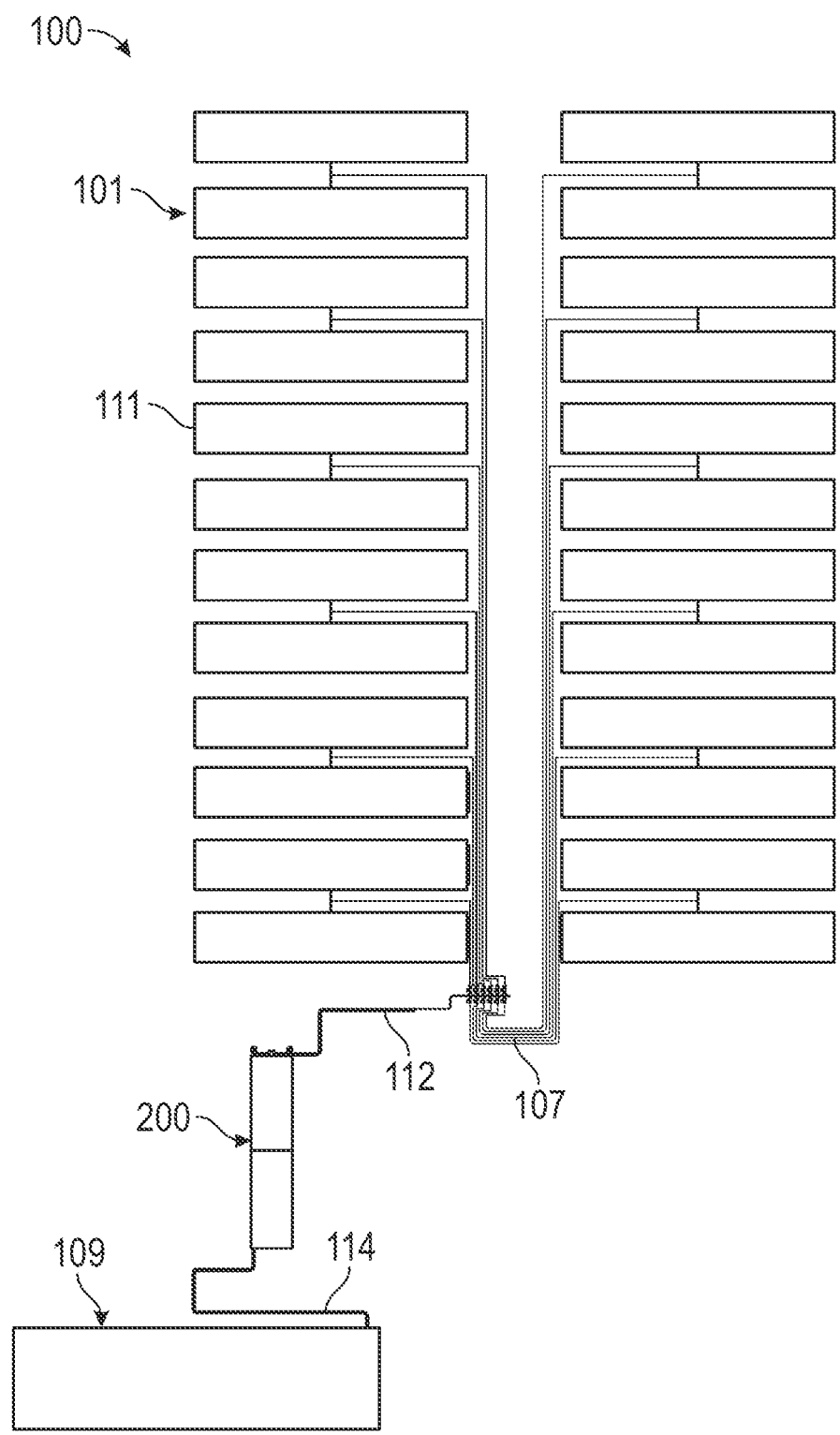
FIG. 1 illustrates a fuel gas distribution system in accordance with an illustrative embodiment of the present disclosure.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are illustrative examples only, and not exhaustive of the scope of the disclosure.

DESCRIPTION OF ILLUSTRATIVE EMBODIMENT(S)

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

As used herein, "fuel gas" includes any gas that may be combusted, including hydrocarbon gases. Examples of fuel gasses include natural gas, compressed natural gas (CNG), field gas, synthesis gas, liquefied natural gas (LNG), gas residue, sale line gas, hydrogen, methane, propane, butane and combinations thereof. Field gas may include any hydrocarbon gas that is obtained directly from an oil and/or natural gas well or field of wells.

As used herein, the term "fuel consuming asset" includes any equipment or component of a system that consumes fuel gas. The term "fuel consuming asset" further includes any fuel consuming equipment that needs to be fed fuel gas "on-location" because, for example, the equipment is remotely located and/or the equipment needs to operate continuously and therefore taking the equipment offline to refuel or move the equipment results in asset downtime. In one embodiment, the fuel consuming asset may be equipment used in oilfield applications such as, for example, equipment used to provide power for, in construction of, or development of oil and gas fields. The term "fuel consuming asset" may include a number of other equipment including, for example, electrical generators, irrigation pumps, emergency response generators, or any oilfield services equipment (e.g., fracturing equipment, etc.).

In one or more exemplary embodiments there is disclosed herein a new and improved distribution system for fuel gas and associated methods used to distribute fuel gas to a fuel consuming asset.

FIG. 1 illustrates a fuel gas distribution system 100 in accordance with an illustrative embodiment of the present disclosure. The fuel gas distribution system 100 includes a fracking fleet 101, a vaporizer and compression system (VCS) 200, a distribution line system 107, and a liquid fuel gas (LFG) source 109. The fracking fleet 101 further comprises one or more fuel consuming assets 111. The VCS 200 includes a fuel gas inlet 114 and a distribution outlet 112. The LFG source provides liquid fuel gas (LFG) to the VCS 200 via the fuel gas inlet 114. The VCS 200 provides compressed fuel gas (CFG) to the distribution line system 107 via the distribution outlet 112. The distribution line system 107 may include a daisy system, a caterpillar system, or any other type of fuel gas distribution system.

Figure 2:
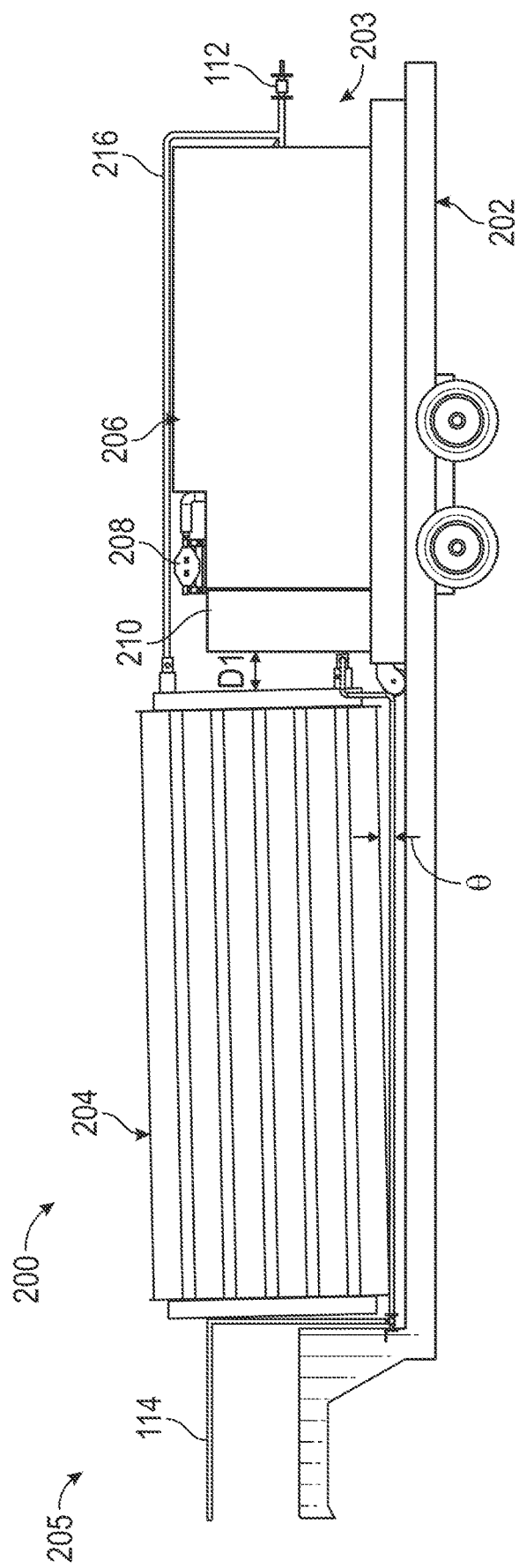
FIG. 2 illustrates a vaporizer and compression system (VCS) in accordance with an illustrative embodiment of the present disclosure.

FIG. 2 illustrates a vaporizer and compression system (VCS) 200 in accordance with an illustrative embodiment of the present disclosure. The VCS 200 includes a mounting base 202, a vaporizer 204 (e.g., ambient vaporizer), and a compressor 206. The vaporizer 204 and the compressor 206 are disposed on (e.g., mounted on) the mounting base 202. The mounting base 202 is a trailer and includes a distribution end 203 and a supply end 205. The vaporizer 204 is mounted on the mounting base 202 at a location proximal to the supply end 205 of the mounting base 202. The compressor 206 is mounted on the mounting base 202 at a location proximal to the distribution end 203 of the mounting base 202.

Figure 3A:
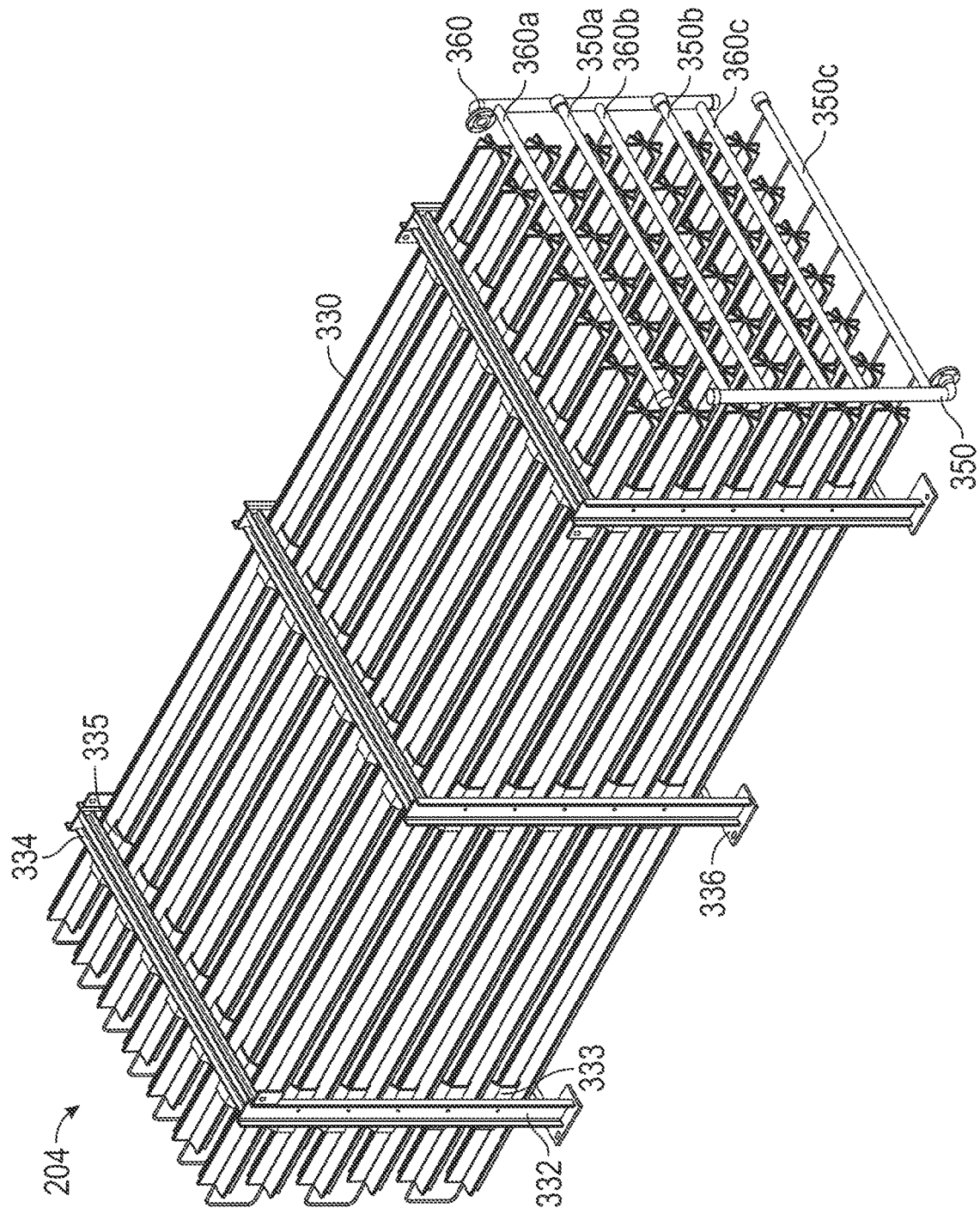
FIG. 3A illustrates a perspective view of the vaporizer in accordance with an illustrative embodiment of the present disclosure.
Figure 3B:
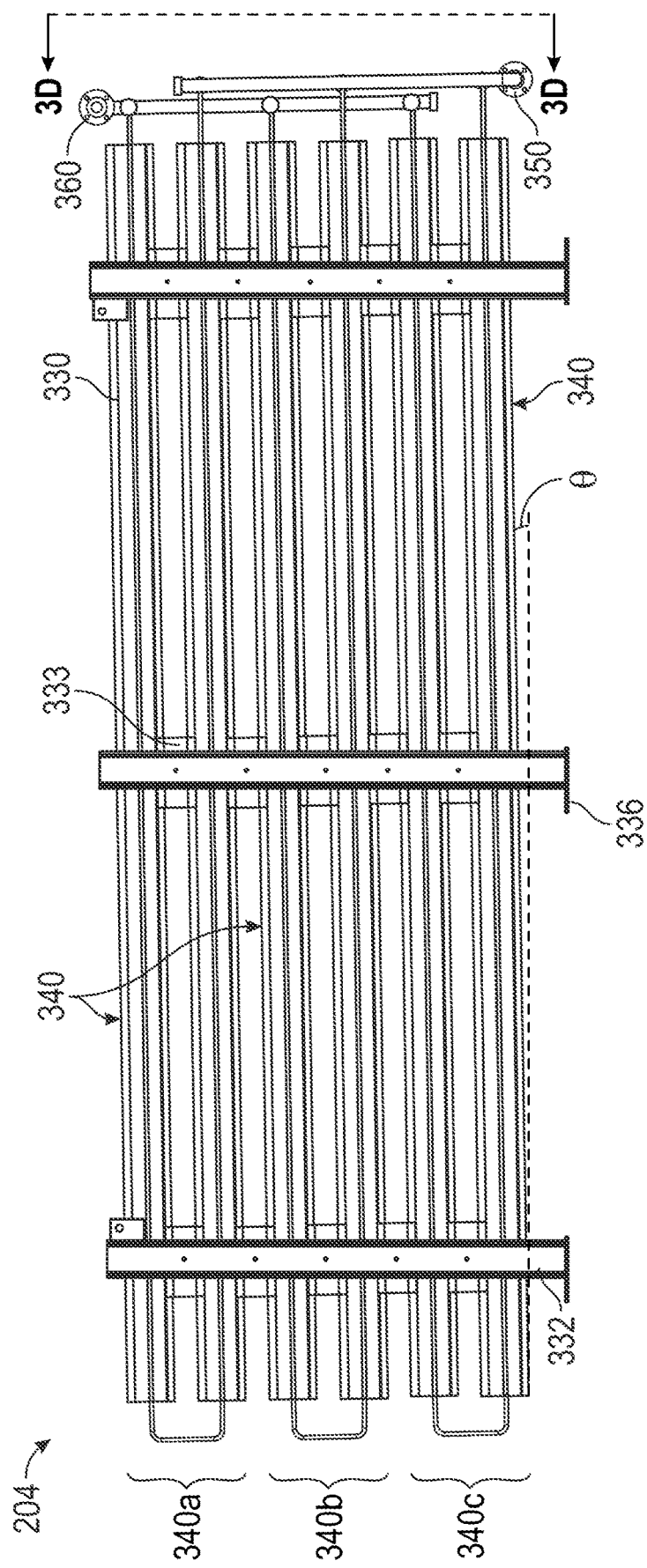
FIG. 3B illustrates a side view of the vaporizer in accordance with an illustrative embodiment of the present disclosure.
Figure 3C:
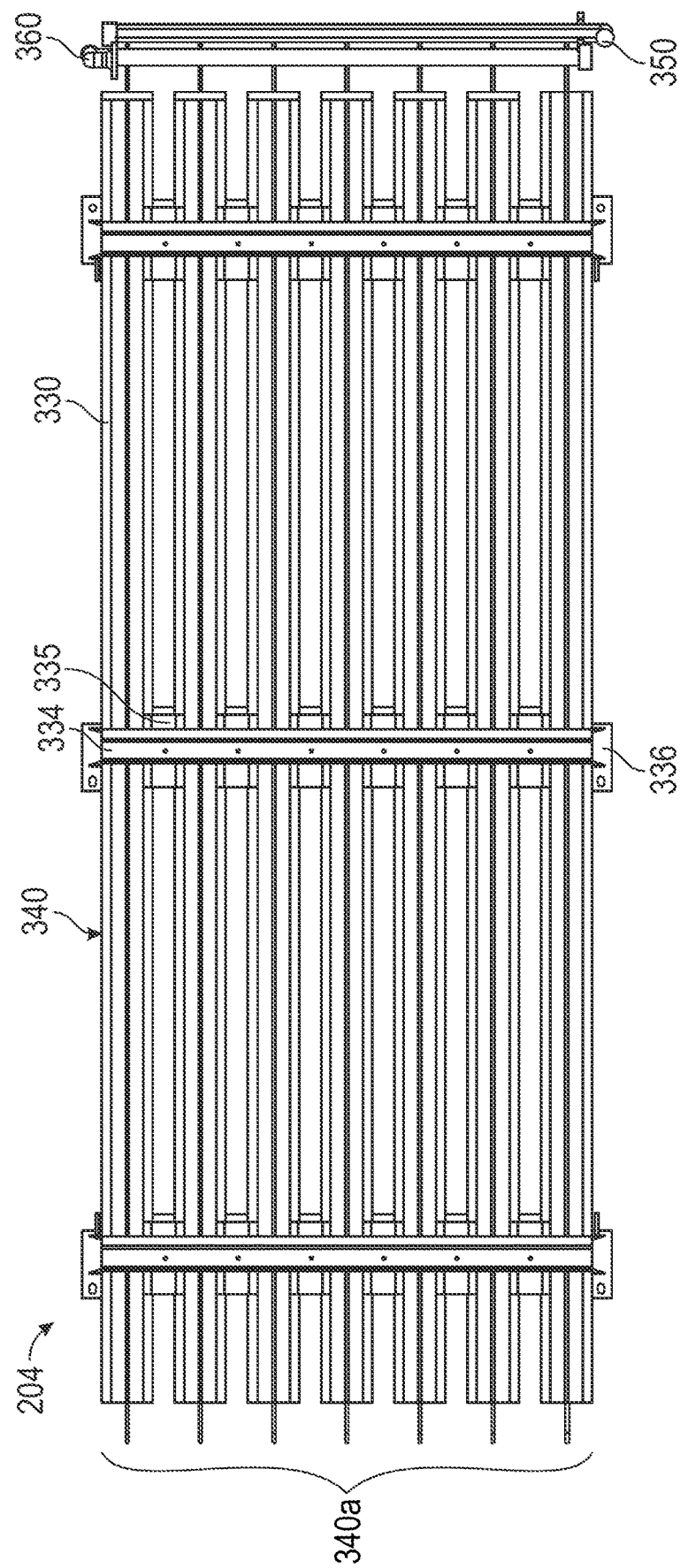
FIG. 3C illustrates a top view of the vaporizer in accordance with an illustrative embodiment of the present disclosure.
Figure 3D:
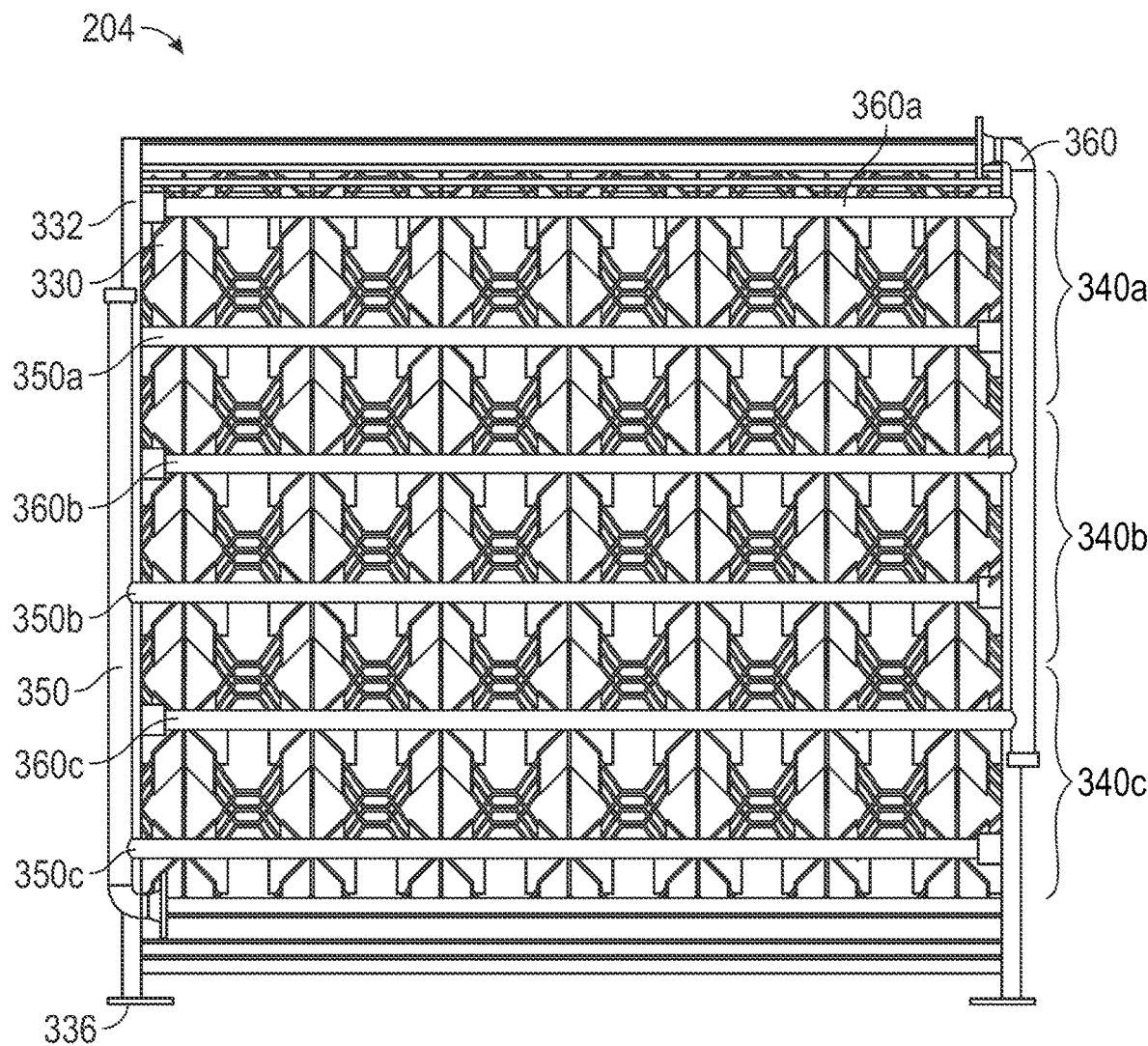
FIG. 3D illustrates a front view of a vaporizer at line 3D-3D in accordance with an illustrative embodiment of the present disclosure.

FIGS. 3A-3D illustrate the vaporizer 204. FIG. 3A illustrates a perspective view of the vaporizer 204. FIG. 3B illustrates a side view of the vaporizer 204. FIG. 3C illustrates a top view of the vaporizer 204. FIG. 3D illustrates a front view of a vaporizer 204 at line 3D-3D. The vaporizer 204 is an ambient air vaporizer, which is a heat exchanger that facilities the transfer of atmospheric thermal energy to a medium flowing therein, such as liquefied natural gas. The vaporizer 204 is constructed of one or more tubes, fins, liners, and other components for housing a medium therein while transferring thermal energy thereto (e.g., a plurality of channels 330). Stainless steel, aluminum, or other alloys are used for the construction of the channels 330 of the vaporizer 204, but it is contemplated that other materials may be used depending on pressure, temperature, and containment specifications. In one example, the vaporizer 204 operates at an internal pressure of 100 psi to 500 psi, but may be configured to withstand over 800 psi, such as about 1000 psi.

The vaporizer 204 comprises the fuel gas inlet 114 and a fuel gas outlet 216. The fuel gas inlet 114 provides LFG to the vaporizer 204 from the LFG source 109. The vaporizer 204 is configured to regasify (or vaporize) the LFG to form regasified (or vaporized) fuel gas (RFG). The fuel gas outlet 216 is configured to provide the RFG to the compressor 206. Certain configurations of channels 330 may increase the surface area of the channels 330. Increasing the surface area of the channels may increase the amount of LFG regasified into RFG, as surface area and regasification are directly related. For example, fin, heat sinks, or the like may be adhered to the exterior surface of the channels 330 to increase the exterior surface area thereof, thus improving heat transfer.

In some embodiments, the plurality of channels 330 are subdivided into channel groups 340. In the illustrated embodiments, the channels 330 are subdivided into a first channel group 340a, a second channel group 340b, and a third channel group 340c, though greater or fewer channel groups 340 are contemplated by this disclosure. The subdivision into channel groups facilitates fluid travel paths of predetermined lengths to achieve sufficient heat transfer. In one example, all channel groups provide the same travel path length and process the same volume of fluid per unit time. The fuel gas inlet 114 provides the LFG to a vaporizer inlet 350 of the vaporizer 204. The vaporizer inlet 350 provides the LFG to the channels 330. In the illustrated embodiment, the vaporizer inlet 350 provides the LFG to the channels 330 of the first channel group 340a via a first vaporizer inlet 350a, the vaporizer inlet 350 provides the LFG to the channels 330 of the second channel group 340b via a second vaporizer inlet 350b, and the vaporizer inlet 350 provides the LFG to the channels 330 of the third channel group 340c via a third vaporizer inlet 350c.

The RFG is provided to the fuel gas outlet 216 via a vaporizer outlet 360. In the illustrated embodiment, the vaporizer outlet 360 provides the RFG to the fuel gas outlet 216 from the channels 330 of the first channel group 340a via a first vaporizer outlet 360a, the vaporizer outlet 360 provides the RFG to the fuel gas outlet 216 from the channels 330 of the second channel group 340b via a second vaporizer outlet 360b, the vaporizer outlet 360 provides the RFG to the fuel gas outlet 216 from the channels 330 of the third channel group 340c via a third vaporizer outlet 360c.

The channels 330 are support by vertical supports 332 and horizontal supports 334. The vertical supports 332 are coupled to the mounting base 202 via mounting brackets 336. The vertical supports 332 are coupled to the channels 330 through vertical support connectors 333. The horizontal supports 334 are coupled to the channels 330 through horizontal support connectors 335. In some embodiments, the vaporizer 204 is generally oriented horizontally. In some embodiments, the vaporizer 204 is angled upward toward the compressor 206 at an angle θ of about 5° to about 10°, such as about 7° to about 8°, with respect to the mounting base 202. The generally horizontal orientation of the vaporizer 204 (and, consequently, the general horizontal orientation of the channels 330) increases the efficiency of the vaporizer 204 by about ~15-20% relative to a vaporizer in a vertical orientation, aided in part by the increase heat flow across the vaporizer from the compressor 206. The horizontal orientation of the vaporizer 204 may cause an increase in the accumulation of ice on the vaporizer 204 during the regasifying process. The vertical supports 332 and horizontal supports 334 provide additional support to the channels 330 of the vaporizer 204 to compensate for the additional weight of the accumulated ice, thereby allowing the vaporizer 204 to be positioned in a more advantageous position relative to the compressor 206 for increased heat transfer. In some examples, the vertical supports 332 and horizontal supports 334 and u-beams or I-beams formed from a metal, such as steel or aluminum. The vertical supports 332 and horizontal supports 334 are positioned at predetermined intervals, which may vary based on design considerations. In one example, a cowling may be affixed to a vertical support 332 and/or a horizontal support 334 closest to the compressor 206. The cowling facilitates containment of, and directing of, heated gases from the compressor 206 towards the vaporizer 204. Other support structures for the cowling are also contemplated, such as an independent stand or bracket that does not provide support to the channels 330. In some instances one or more fans (such as fan 210) are also utilized to increase directing of heated gases from the compressor 206 to the vaporizer 204. The one or more fans may be used with or without a cowling. The cowling may extend between the compressor 206 and the vaporizer 204, and may optionally cover some or all of the vaporizer 204 and/or the compressor 206.

The compressor 206 further comprises an exhaust 208, a fan 210, and the distribution outlet 112. The compressor 206 is configured to compress the RFG provided from the vaporizer 204 into a compressed fuel gas (CFG). The distribution outlet 112 is configured to supply the CFG to the fuel consuming assets 111 via the distribution line system 107. The distribution outlet 112 is disposed at a location on the compressor 206 proximal to the distribution end 203 of the mounting base 202. An increase in the outlet pressure of the compressor 206 may increase the displacement value of the VCS 200.

The compressor 206 is configured to burn fuel gas in order to compress the RFG provided by the vaporizer 204. The exhaust 208 is configured to emit air and gases produced during the compression process from the compressor 206.

The fan 210 is disposed between the compressor 206 and the vaporizer 204. The fan 210 may include one or more fans, such as about 5 fans. The exhaust 208 is disposed at a location proximate to the fan 210. The fan 210 is configured to direct heat from the compressor 206 towards the vaporizer 204. In one example, the heat from the compressor 206 may be thermal energy removed by a cooling system of the compressor. Additionally or alternatively heat may be extracted directly from the mechanical components of the compressor 206 by the fan 210, and/or the heat may be thermal energy from the exhaust 208. A distance DI separates the fan 210 from the vaporizer 204. The distance DI is about 2 inches to about 10 inches, such as about 6 to about 10 inches, such as about 6 inches to about 8 inches. However, other distances are also contemplated, based on the volumetric flow rate of the fan 210, as well as the amount of thermal energy transferred by the fan.

The flow of air and gases emitted from the exhaust 208 increases the air flow and the ambient temperature around the vaporizer 204. The efficiency of the vaporizer 204 to regasify LFG is dependent on the air flow and ambient temperature around the vaporizer 204. An increase in the air flow around the vaporizer 204 increases the efficiency of the vaporizer by reducing the likelihood of ice buildup on the vaporizer 204, as well as by increasing the transfer of thermal energy to the medium (e.g., LNG) within the vaporizer. The reduction in the likelihood of ice buildup may be due to the removal of moisture in the air by flowing dry air and gases past the vaporizer 204. In addition, an increase in the ambient temperature around the vaporizer 204 increases the efficiency of the vaporizer 204 by increasing the temperature differential between the ambient air and the LFG in the vaporizer 204.

The fan 210 has an air flow of about 1 cfm to about 10,000 cfm. The temperature of the air and gases emitted from the exhaust 208 may create a temperature differential of about-220° C.-300° C. between the air and gases and the vaporizer 204. The increase in the air flow and the temperature differential increases the capability of the vaporizer 204 to form RFG by a multiple of about 2 to about 4, relative to conventional systems, thus reducing the hardware required on location. The increase in the capability of the vaporizer 204 reduces the surface area taken up by the vaporizers by at least 40%, such as by at least 50%, such as by at least 60%. Further, the increase in the air flow and the temperature differential increases the displacement value of the fracking fleet to at least about 75%, such as at least 80%, such as at least 90%. Thus, using configurations described herein results in reduced hardware costs, reduced operating costs, reduced footprint, and reduced transportation costs, relative to conventional systems.

As the fan 210 flows the air and gases emitted from the compressor 206 through the vaporizer 204, the air and gases are cooled by the vaporizer 204. As the air and gases cool, the density of the air and gases may increase. The angle of the vaporizer 204 with respect to the mounting base 202 enables the air and gases, as the air and gases cool, to continue to flow around the components of the vaporizer 204 which are distal from the fan 210. The extended use of the air and gases emitted from the compressor 206 further increases the efficiency of the vaporizer 204. While vaporizer 204 is illustrated in a horizontal orientation, it is to be noted that other orientations are also contemplated. For example, the vaporizer 204 may be oriented vertically to reduce the footprint of the mounting base 202.

Optionally, the vaporizer 204 may be enclosed in a shroud. The shroud captures the air and gases emitted by the compressor 206 in an area surrounding the vaporizer 204. The capture of the air and gases emitted by the compressor 206 maintains an increased temperature differential (by trapping heat near the vaporizer 204) between the ambient temperature and the vaporizer 204, which may further increase the efficiency of the vaporizer 204. Additionally or alternatively, a shroud may be positioned between the fan 210 and the vaporizer 204, to facilitate directional funneling of thermal energy to the vaporizer 204, further improving thermal efficiency.

In some embodiments, the vaporizer 204 may include a water jacket. The water jacket may surround the vaporizer 204 to provide an increased temperature differential between the vaporizer 204 and the ambient temperature around the vaporizer 204, which may further increase the efficiency of the vaporizer 204.

Figure 4:
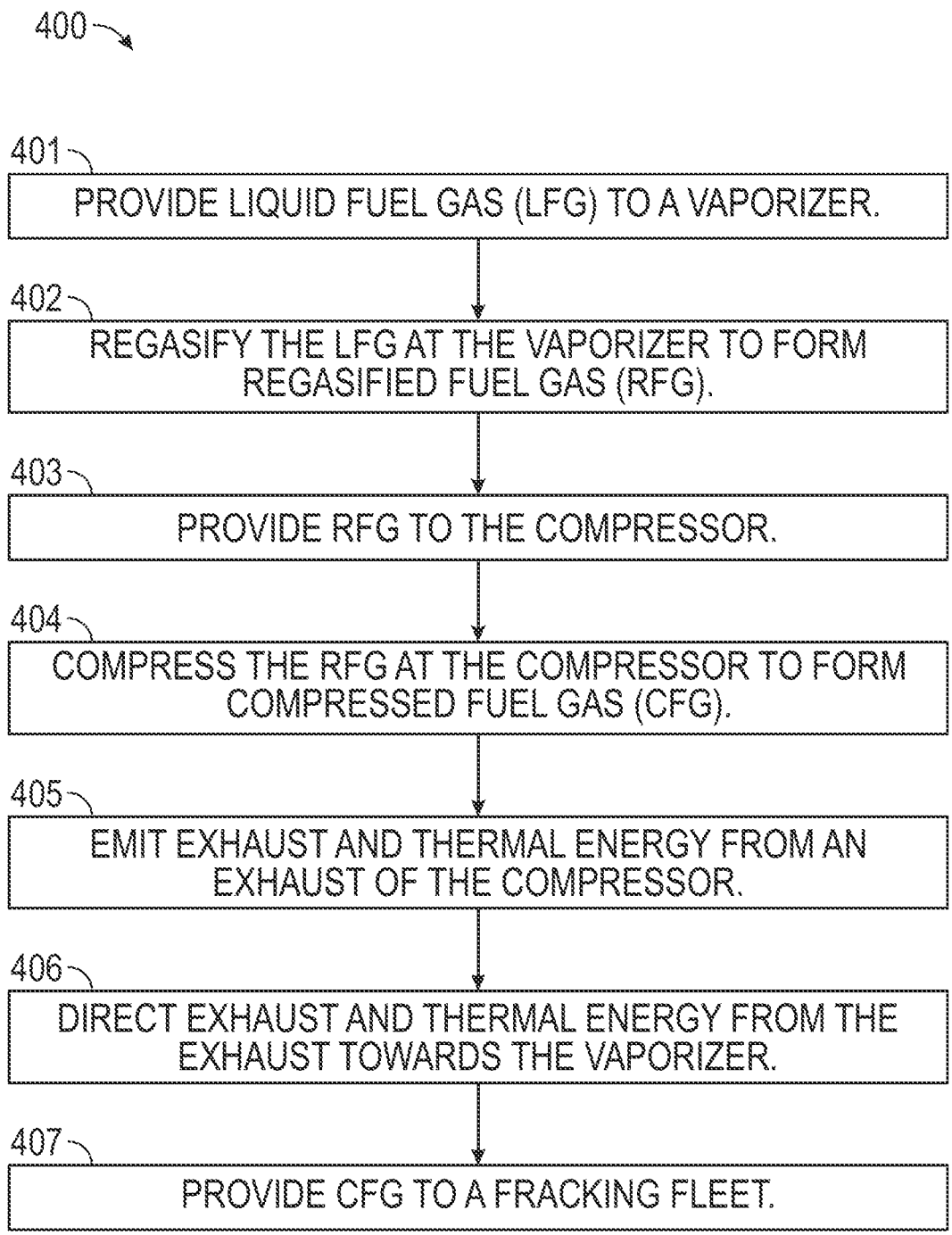
FIG. 4 is a flow diagram of a method of distributing a fuel gas to a fuel consuming asset in accordance with an illustrative embodiment of the present disclosure.

FIG. 4 is a flow diagram of a method 400 of distributing a fuel gas to a fuel consuming asset 111. At operation 401, a liquefied fuel gas (LFG) is provided to a vaporizer 204. The LFG may be provided to the vaporizer 204 by a LFG source via a fuel gas inlet 114.

At operation 402, the vaporizer 204 regasifies the LFG into a regasified fuel gas (RFG). The efficiency of the vaporizer 204 is influenced by the air flow and ambient temperature surrounding the vaporizer 204.

At operation 403, the RFG is provided to the compressor 206 by the vaporizer 204. The RFG may be provided to the compressor via a fuel gas outlet 216.

At operation 404, the RFG is compressed into a compressed fuel gas (CNG) by the compressor 206. At operation 405, the compressor emits exhaust gases and thermal energy. The exhaust gases and thermal energy emitted by the compressor 206 are the result of the compressor 206 burning fuel gas to perform the compression operation, as well as waste energy from the compressor operations.

At operation 406, the exhaust gases and/or thermal energy emitted by the compressor 206 are directed from the compressor 206 toward (and through) the vaporizer 204. The flow and the temperature of the gases directed from the compressor 206 to the vaporizer increase the efficiency of the vaporizer 204.

At operation 407, the compressed fuel gas is provided to a fracking fleet 101. The compressed gas may be provided to the fracking fleet 101 via a distribution outlet 112 and a distribution line system 107.

As would be appreciated by those of ordinary skill in the art with the benefit of the present disclosure the methods and systems disclosed herein provide several advantages. For example, the vaporizer and compression system (VCS) may lead to a reduction in equipment surface area of at least about 40%. Further, the efficiency of the vaporizer may be improved by a multiple of about 2 to about 4, which may result in an increase of the displacement value to at least 70%. As would be appreciated by those of ordinary skill in the art, having the benefit of the present disclosure, this is not intended to be an exhaustive list of all advantages and benefits of the methods and systems disclosed herein and other advantages are apparent to those of ordinary skill in the art, having the benefit of the present disclosure.

As would be appreciated, numerous other various combinations of the features discussed above can be employed without departing from the scope of the present disclosure. While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope. Accordingly, all changes and modifications that come within the spirit of the disclosure are to be considered within the scope of the disclosure.

The invention claimed is:

1. A fuel gas distribution system for distributing fuel to one or more fuel consuming assets, comprising:
 a vaporizer and compression system (VCS), comprising:
  a vaporizer, comprising:
   a fuel gas inlet configured to provide liquid fuel gas (LFG) to the vaporizer from a LFG source; and
   a fuel gas outlet;
  a compressor configured to produce compressed fuel gas (CFG) from LFG, comprising:
   a distribution outlet;
   an exhaust; and
   a fan, wherein the fan is configured to flow one or more of gas and thermal energy emitted from the compressor toward the vaporizer; and
  a mounting base, wherein the vaporizer and the compressor are disposed on the mounting base.

2. The fuel gas distribution system of claim 1, wherein the vaporizer is disposed at a supply end of the mounting base and the compressor is disposed at a distribution end of the mounting base.

3. The fuel gas distribution system of claim 1, wherein the vaporizer is angled upward towards compressor with respect to the mounting base at an angle of 5° to 10°.

4. The fuel gas distribution system of claim 1, wherein a distance separates the fan and the vaporizer, the distance being 2 inches to 10 inches.

5. The fuel gas distribution system of claim 1, wherein the distribution outlet is configured to distribute fuel to one or more fuel consuming assets via a daisy system or a caterpillar system.

6. The fuel gas distribution system of claim 1, wherein the vaporizer is enclosed in a shroud.

7. The fuel gas distribution system of claim 1, wherein the vaporizer is surrounded by a water jacket.

8. A fuel gas distribution system for distributing fuel to one or more fuel consuming assets, comprising:
 a vaporizer and compression system (VCS), comprising:
  a vaporizer, comprising:
   a fuel gas inlet configured to provide liquid fuel gas (LFG) to the vaporizer from a LFG source;
   a fuel gas outlet;
   a plurality of channels;
   a plurality of vertical supports; and
   a plurality of horizontal supports, wherein the vertical supports and horizontal supports support the plurality of channels;
  a compressor configured to produce compressed fuel gas (CFG) from LFG, comprising:
   a distribution outlet;
   an exhaust; and
   a fan, wherein the fan is configured to flow one or more of gas and thermal energy emitted from the compressor toward the vaporizer; and
  a mounting base, wherein the vaporizer and the compressor are disposed on the mounting base.

9. The fuel gas distribution system of claim 8, wherein the vaporizer is configured to have an internal pressure of 100 psi to 1000 psi.

10. The fuel gas distribution system of claim 8, wherein the plurality of channels comprise a plurality of fins, tubes, or liners.

11. The fuel gas distribution system of claim 8, wherein the plurality of channels comprise a stainless steel, aluminum, or other alloy.

12. The fuel gas distribution system of claim 8, wherein the plurality of channels further comprises:
- a first channel group, wherein a first vaporizer inlet provides LFG to the first channel group;
- a second channel group, wherein a second vaporizer inlet provides LFG to the second channel group; and
- a third channel group, wherein a third vaporizer inlet provides LFG to the third channel group.

13. The fuel gas distribution system of claim 12, wherein:
the first channel group provides regasified fuel gas (RFG) to the compressor via a first vaporizer outlet;
the second channel group provides regasified fuel gas (RFG) to the compressor via a second vaporizer outlet; and
the third channel group provides regasified fuel gas (RFG) to the compressor via a third vaporizer outlet.

14. The fuel gas distribution system of claim 8, wherein:
the vertical supports are coupled to the mounting base via mounting brackets;
the vertical supports are coupled to the channels through vertical support connectors; and
the horizontal supports are coupled to the channels through horizontal support connectors.

\* \* \* \* \*